Nov. 7, 1950          L. G. SCHERER          2,528,790
AUTO CHECKING AND COUNTING MEANS FOR PARKING AREAS
Filed March 29, 1947
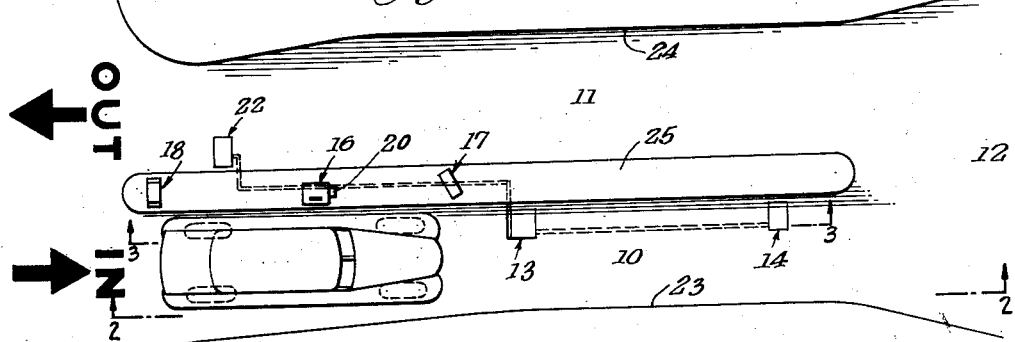
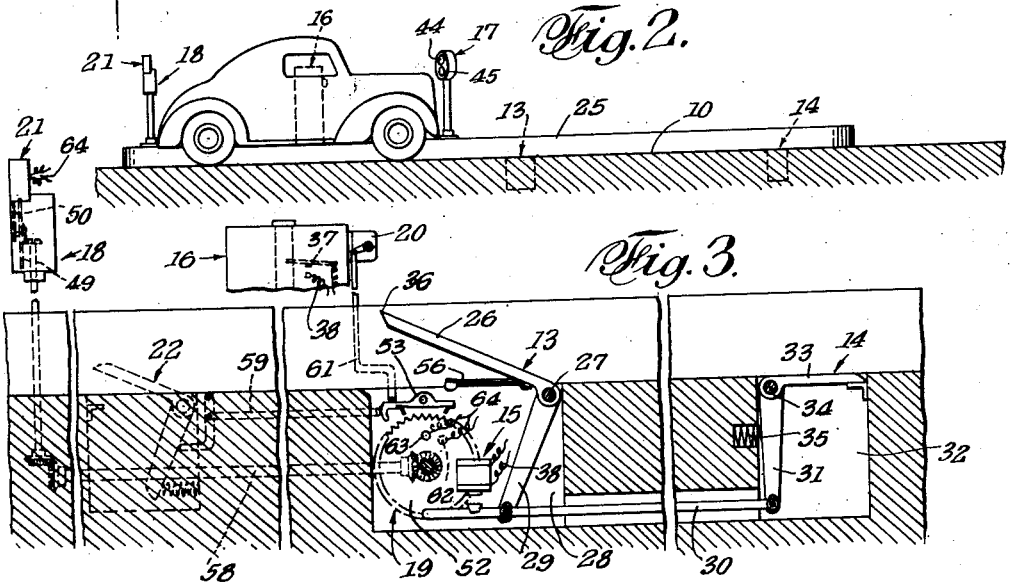
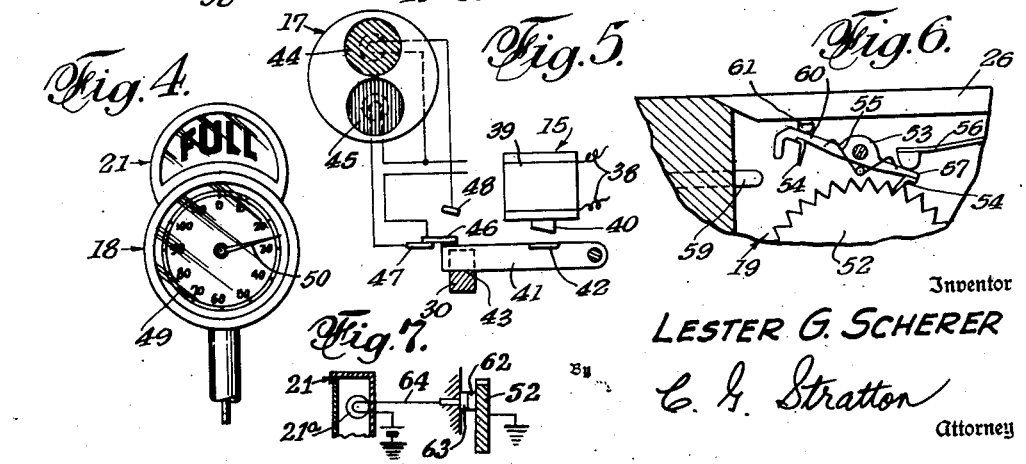
Inventor
LESTER G. SCHERER
C. G. Stratton
Attorney Patented Nov. 7, 1950

2,528,790

UNITED STATES PATENT OFFICE 2,528,790

AUTO CHECKING AND COUNTING MEANS FOR PARKING AREAS

Lester G. Scherer, Los Angeles, Calif.

Application March 29, 1947, Serial No. 738,240

5 Claims. (Cl. 235—99)

This invention relates to the checking in and out of automotive vehicles for garages and other parking areas and has for its primary object to provide automatic means for handling automobiles as indicated without the need for an attendant.

Another object of the present invention is to provide coin or other controlled means movable to admit an auto to a parking area and simultaneously recording or registering autos so admitted.

Another object of the invention is to provide means for recording or registering an auto leaving a parking area.

Another object of the invention is to provide means for recording or registering the number of autos admitted to a parking area on a meter and also recording, by subtraction, the number of cars leaving said area, whereby, at any given time, the number of autos in said area is known by reading said meter.

Another object of the invention is to provide means, as indicated, which embodies a signal or the like automatically indicating that a parking area is full to capacity.

A further object of the invention is to provide means interposed in the path of movement of autos entering a parking area to prevent their admittance until a suitable coin, coins, or other control means removes said interposed means, and also to provide means for recording autos thus admitted.

A still further object of the invention is to provide means, operated by an auto entering a parking area, for resetting the above indicated means in the path of movement of the autos to be interposed in the path of the next auto seeking admittance.

My invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Fig. 1 is a top plan view of one entrance lane and an adjacent exit lane of a parking area, showing, schematically, the means of the present invention.

Fig. 2 is a longitudinal sectional view as taken on the line 2—2 of Fig. 1.

Fig. 3 is an enlarged broken longitudinal sectional view as taken on line 3—3 of Fig. 1.

Fig. 4 is a face view of a meter for indicating the number of autos in a parking area and apprizing motorists seeking admittance to said area that the area is full to capacity if such is the case.

Fig. 5 is a diagrammatic view of means controlled by a coin, coins or other control means for releasing barrier means in the path of an auto seeking admittance to a parking area and including "stop" and "go" signals operated thereby.

Fig. 6 is an enlarged fragmentary sectional view detailing means for actuating the auto recording or registering means of Fig. 4 and for actuating auto counting means employed in the invention.

Fig. 7 is a wiring diagram of a portion of the indicating means of Fig. 4 and a circuit for operating the same.

The auto checking and counting means, in the preferred form illustrated, comprises, generally, an entrance lane 10 and an exit lane 11 for a parking area 12; barrier means 13 in the entrance lane normally disposed in the line of movement of an auto barrier; re-setting means 14 in the entrance lane; latching means 15 for the barrier; controlled means 16 for the latching means; signal means 17 responsive to the movement of the latching means; a checking meter 18; means 19, actuated by the barrier, for registering the movement thereof and thereby registering autos moving along line 10; a counter 20 actuated by means 19; a visual indicator 21, also controlled by means 19, for indicating a filled condition of the parking area 12; and means 22 disposed in the exit lane 11 and movable by an auto to actuate means 19 in a reverse direction and thereby record outgoing autos by decreasing the reading of meter 18.

The lanes 10 and 11 are formed by suitable curbs 23 and 24 and an island curb 25 so arranged that autos are directed to pass over barrier 13 and means 14 in lane 10, and over means 22 in lane 11.

The barrier means 13 may vary considerably in form and arrangement. As shown, said barrier means comprises a plate 26 on a pivot 27 arranged to bridge the top of a pit 28 so that one wheel of an auto will pass thereover. Said plate is provided with an arm 29 which extends into the pit, and a bar 30 connects the same with a similar arm 31 of the means 14 extending into a pit 32. A plate 33 is fixed with arm 31 to hinge on a pivot 34. Means, such as a spring 35, urges the plate 26 to a down position flush with the level of the lane 10, and the plate 33 to an up position. The latching means 15, however, normally holds plate 26 up and, because the pivot 27 is on the far side of said plate, the free edge 36 thereof is interposed in the path of movement of an auto.

The means 16 is shown as coin-controlled and, in a simple manner, is provided with a coin-actuated switch 37 which, through a suitable electric circuit 38, is adapted to energize coil 39 of the means 15 when a coin or coins actuates said switch. The means 16 is preferably located on the island 25 in a position handy to the driver of an auto on lane 10.

The means 15 includes said coil 39, a core 40 in the coil, and a pivoted latch 41 having an armature 42 associated with the core and normally residing in a notch 43 of bar 30. Upon energization of coil 39, the latch 41 will be raised from the notch so that spring 35 becomes effective to depress plate 26 on its pivot and thus clear the path of movement of an auto. The connecting bar 30 will simultaneously raise plate 33 and, as an auto passes over the latter, the plate 26 will be re-set to its elevated position.

The signal means 17 comprises "Go" and "Stop" lights 44 and 45 respectively. A contact element 46 on the latch 41 normally engages a contact element 47 to keep the "Stop" light 45 illuminated until said latch is operated to move element 46 into contact with element 48 and thereby close the circuit to "Go" lamp 44.

The meter 18 is shown as a dial 49 having unit divisions or graduations, and an index 50 associated therewith. Said meter is preferably located on island 25 at the entrance to lane 10. The index 50 is driven by the means 19 which consists of a toothed wheel 52 preferably located in pit 28 and a tiltable lever 53 so mounted with respect to said toothed wheel that movement thereof will bring one or the other of fingers 54 into engagement with a tooth to rotate the wheel 52 an angular distance equal to the width of one tooth. Accordingly, the fingers 54 are made to flex so that they engage against one side of a tooth, flex inwardly while they effect said rotation of the wheel, and on the recovery movement of lever 53, as caused by spring 55, unflex to engage the same side of the next tooth.

The plate 26 carries a spring arm 56 which, when said plate moves down, moves an arm 57 of lever 53 to cause the finger 54 on that arm to rotate wheel 52 in one direction. My means of a suitable driving connection 58, this rotation of wheel 52 causes a commensurate movement of index 50.

The means 22 is similar to the means 14 and a driving connection 59, upon an exiting auto depressing said means 14, moves an arm 60 on lever 53 to cause finger 54 thereon to rotate wheel 52 in the opposite direction and thereby move the index in a direction opposite to its movement under control of plate 26. Thus, when the plate 26 controls, the index moves to increase the reading of dial 49 and when means 22 controls, the index moves to decrease said reading.

Simultaneously with movement of lever 53 by plate 26, the counter 20 is actuated by a connection 61 with said lever. Thus, the total number of autos entering the parking area is recorded by said counter, and the differential of those entering and leaving (those at any given time remaining in the area) is registered on meter 18.

A lamp 21ª in the visual indicator 21 flashes on when the wheel 52, which carries a contact 62, has progressed sufficiently in the direction driven by plate 26, to engage fixed contact 63 to close a circuit 64 to said indicator. This indicator will apprize incoming drivers that the area is filled. As an auto leaves the area, the wheel 52 is retracted to break said circuit and darken said indicator.

The invention has been described in its most simple form and the instrumentalities illustrated have been conventionalized for clarity of illustration. The means 16 may be more elaborate in that it may dispense a ticket or tag requiring re-insertion into said means to release the means 22 so that an auto may pass through the exit lane. Further said ticket may be used to control said release of means 22 upon payment of fees for overtime parking. In the latter case, the means in lane 11 will follow the design of the means in lane 10 but the ticket and coins will control the operation.

Although not shown, suitable means may be embodied to have only one wheel of an auto effect the operation of the various devices. Should two autos, simultaneously seek to operate lever 53, the spring arm 56 will yield to the means 59 and, after the exiting auto has passed, said arm will then be released to exert its operative force on said lever.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications that may fall within the scope of the appended claims.

Having thus described my invention, what I claim and desire to secure by Letters Patent is:

1. Means of the character described comprising a parking area entrance lane for vehicles, barrier means interposed in the path of a vehicle moving along said lane, controlled means for removing said barrier means to clear the lane for forward movement of the vehicle, and means connected to the barrier and operated thereby for registering a vehicle passing thereover, said latter means including a cumulative register, a meter driven by the controlled means in one direction to register successive operations of the controlled means, a visual indicator associated with the meter to show that the parking area is filled to capacity, and a normally open electric circuit connecting the controlled means and the visual indicator, said circuit embodying a switch that is closed when the controlled means, after a plurality of operations, assumes a predetermined position to render the visual means visible.

2. Means of the character described comprising an entrance lane and an exit lane for a parking area for vehicles entering and leaving said area, barrier means in the entrance lane in the path of a vehicle moving therealong, controlled means for removing said barrier means to clear said lane for forward movement of a vehicle, a cumulative meter operated by the barrier for recording the number of times that the barrier is removed, a capacity-checking meter, means operated by said barrier for additively recording on said latter meter an auto passing said barrier, and means in the exit lane connected to the barrier-operated means for subtractively recording on said latter meter an auto passing along said exit lane.

3. Means of the character described comprising an entrance lane and an exit lane for a parking area for vehicles entering and leaving said area, barrier means in the entrance lane in the path of a vehicle moving therealong, controlled means for removing said barrier means to clear said lane for forward movement of a vehicle, a cumulative meter operated by the barrier for recording the number of times that the barrier is removed, a capacity-checking meter, means operated by said barrier for additively recording on said latter meter an auto passing said barrier, means in the exit lane connected to the barrier-operated means for subtractively recording on said latter meter an auto passing along said exit lane, visual means associated with the latter meter for indicating a filled condition of the parking area, and an operative connection between the barrier-operated means and the visual means to set the latter to indicate a filled condition when the barrier-operated means is operated a pre-determined number of times more by vehicles moving in the entrance lane than by vehicles moving in the exit lane.

4. In means of the character described, an entrance and an exit lane for a parking area, a barrier in the entrance lane in the path of movement of a vehicle, means controlling said barrier to move the same out of the path of movement of a vehicle, a registering meter, means responsive to the movement of the barrier to increase the reading of the meter, means in the exit lane operable by a vehicle moving therealong for actuating the mentioned responsive means to decrease the reading of the meter, a cumulative counter, and means connecting said counter and said responsive means for operating the former only when said responsive means is actuated by the mentioned barrier.

5. In a parking area checking means of the character described, a vehicle lane connected with said area, a movable barrier in the surface of said lane and having a normally elevated edge presented to a wheel of an oncoming vehicle to arrest the progress of the same, means controlled by the operator of the vehicle to release said barrier, means upon release thereof to move the barrier to a low position with respect to the lane surface to clear the path of movement of said vehicle, cumulative means for registering each such movement of the barrier, a movable plate in the surface of said lane beyond the barrier and mechanically connected to the latter, said movable plate having a low position with respect to the lane surface when the barrier is elevated and a raised position when the barrier is low with respect to said lane surface, the oncoming vehicle moving the plate to low position and thereby restoring the barrier to elevated position, a second vehicle lane, a normally elevated movable plate in the latter lane and adapted to be moved to a low position by a vehicle moving in said lane, meter means for registering the difference between the number of vehicles passing through the lanes to thereby register the number of vehicles remaining in the parking area, means controlled by the barrier for additively registering on said meter means, and an operative connection between the movable plate in the exit lane and the latter means for subtractively registering on said meter.

LESTER G. SCHERER.

REFERENCES CITED

The following references are of record in the file of this patent:

UNITED STATES PATENTS

| Number | Name | Date |
|---|---|---|
| 1,410,292 | Granstrom | Mar. 21, 1922 |
| 1,773,718 | Barney | Aug. 26, 1930 |
| 2,015,607 | Shinn | Sept. 24, 1935 |
| 2,073,834 | Duany | Mar. 16, 1937 |
| 2,077,767 | Morse | Apr. 20, 1937 |
| 2,094,216 | Hunter | Sept. 28, 1937 |
| 2,421,774 | Colt et al. | June 10, 1947 |

FOREIGN PATENTS

| Number | Country | Date |
|---|---|---|
| 378,945 | Germany | Aug. 9, 1923 |